C. EIBYE & C. A. PETERSEN.
SHOCK ABSORBER.
APPLICATION FILED JAN. 14, 1915.

1,247,094.

Patented Nov. 20, 1917.
3 SHEETS—SHEET 1.

Witnesses:
Horace A. Croseman
Llewellyn Richards

Inventors:
Carl Eibye,
Christian A. Petersen,
by Emery, Booth, Janney & Varney
Attys.

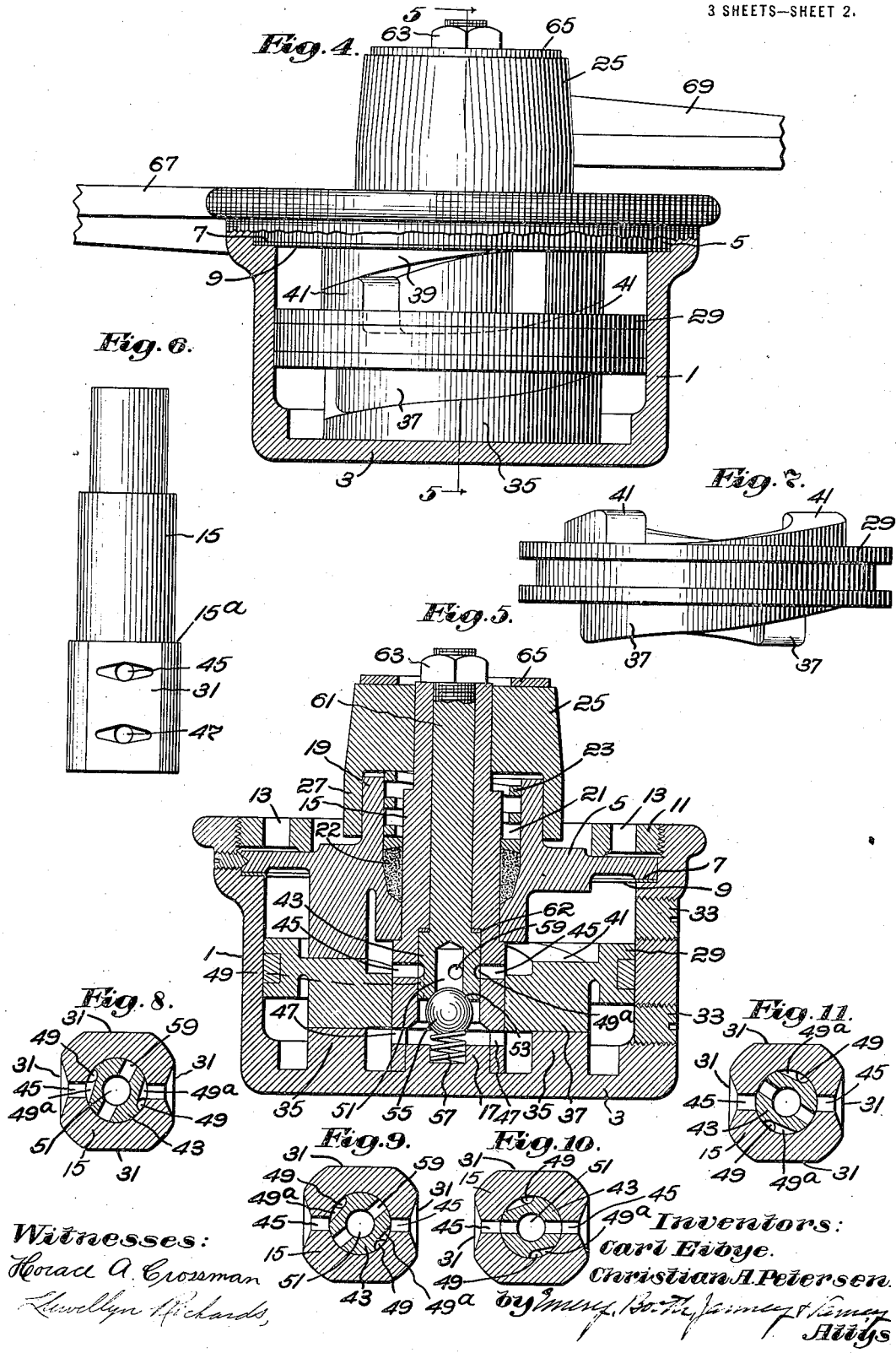

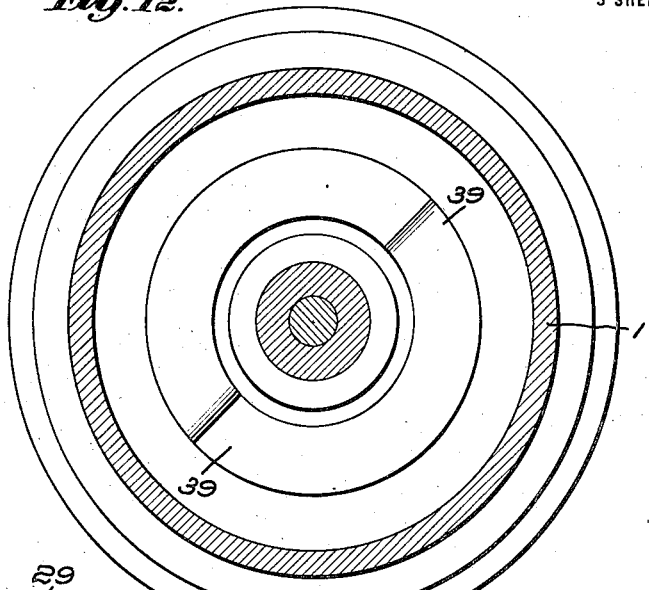
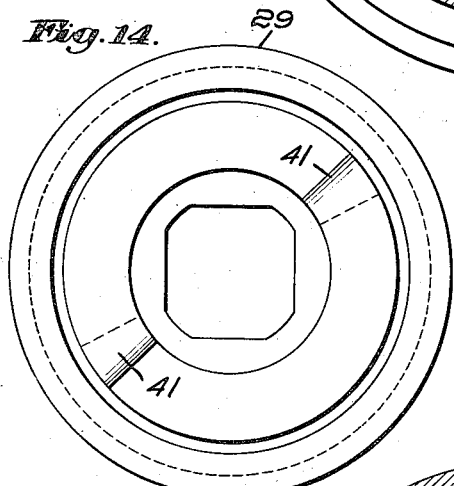
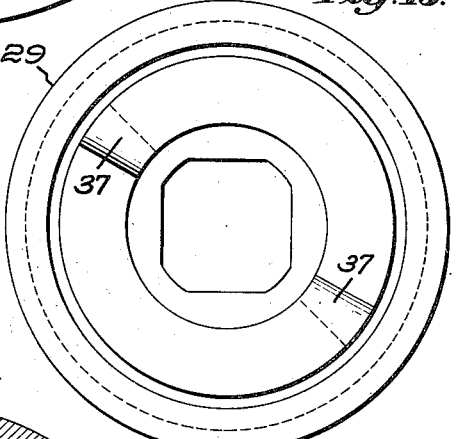
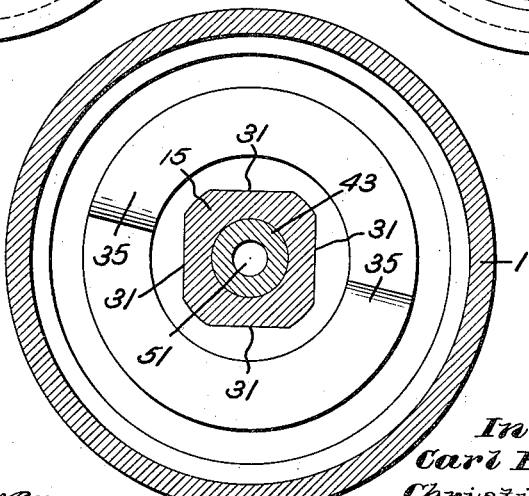

UNITED STATES PATENT OFFICE.

CARL EIBYE, OF BOSTON, AND CHRISTIAN A. PETERSEN, OF BEVERLY, MASSACHUSETTS.

SHOCK-ABSORBER.

1,247,094.	Specification of Letters Patent.	Patented Nov. 20, 1917.

Application filed January 14, 1915. Serial No. 2,122.

*To all whom it may concern:*

Be it known that we, CARL EIBYE and CHRISTIAN A. PETERSEN, citizens of the United States, and residents, respectively, of Boston, county of Suffolk, and Commonwealth of Massachusetts, and Beverly, county of Essex, and said Commonwealth, have invented an Improvement in Shock-Absorbers, of which the following description in connection with the accompanying drawings, is a specification, like characters on the drawings representing like parts.

This invention relates to shock absorbers and among other objects provides a simple and effective device whereby a variable cushioning effect may be obtained.

The character of the invention may be best understood by reference to the following description of an illustrative embodiment thereof shown in the accompanying drawings, wherein.

Figure 1:
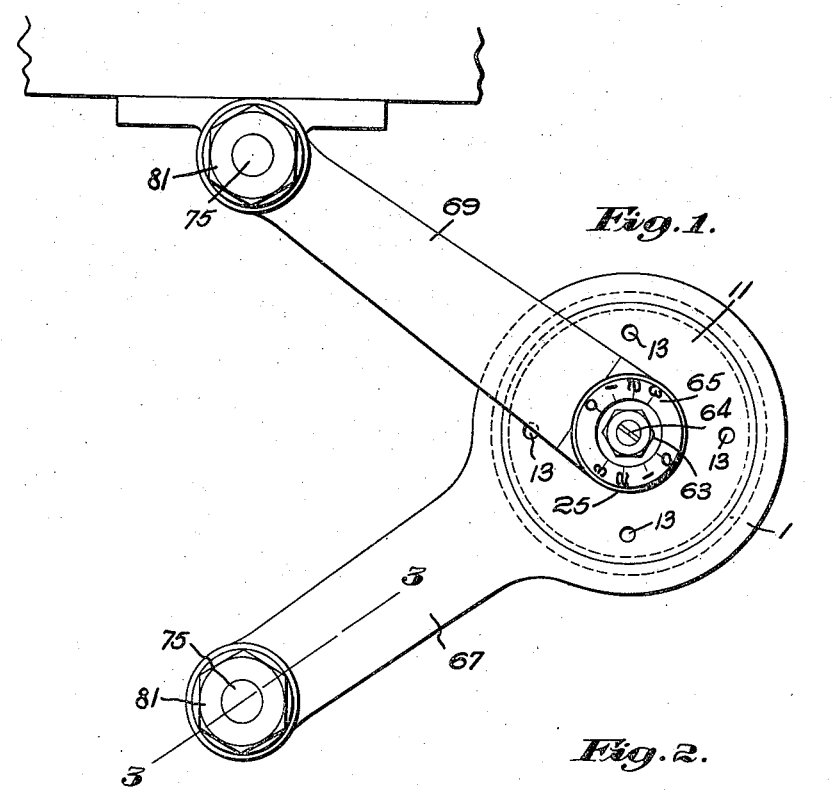
Figure 1 is a side elevation of an illustrative shock absorber shown herein as embodying the invention.
Figure 2:
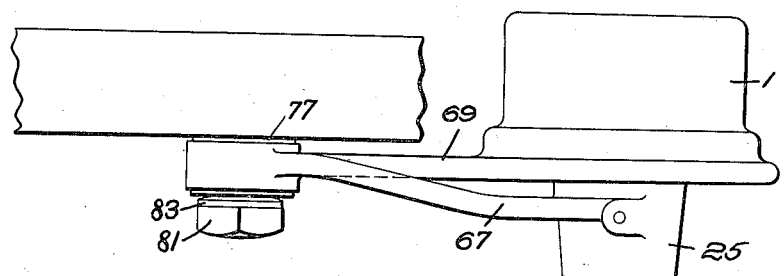
Fig. 2 is a plan of the shock absorber shown in Fig. 1.
Figure 3:
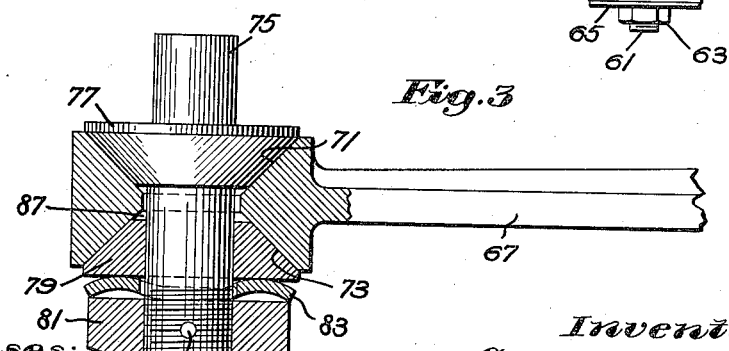

Fig. 3 on an enlarged scale is a section taken on line 3—3 of Fig. 1;

Fig. 4 on an enlarged scale is a view partly in side elevation and partly in section of the shock absorber shown in Fig. 1;

Fig. 5 is a transverse section taken on line 5—5 of Fig. 4;

Fig. 6 is a side elevation of a shaft shown in Fig. 5;

Fig. 7 is a side elevation of a piston adapted to slide along the shaft shown in Fig. 6;

Fig. 8 is a transverse section through the shaft and a valve member therein;

Figs. 9, 10 and 11 are views similar to Fig. 8 showing the valve member in different positions of adjustment in the shaft;

Fig. 12 is a view from within the shock absorber looking toward one of the heads thereof showing a disposition of cams thereon;

Fig. 13 is a view of the opposite head of the shock absorber showing the disposition of the cams thereon;

Fig. 14 is a plan of the piston shown in Fig. 7; and

Fig. 15 is a bottom view of the piston shown in Fig. 7.

Referring to the drawings, the illustrative shock absorber shown therein as embodying the invention comprises a cylinder 1 or other equivalent container having a head 3 preferably integral therewith and a removable head 5. To secure the removable head to the cylinder the latter is counter-bored to present a shoulder 7 on which the head 5 is seated, a suitable gasket 9 being interposed between them. A ring 11 is threaded within the cylinder and provided with holes 13 for receiving a spanner wrench whereby the ring may be adjusted to press the head 5 toward the shoulder 7 and firmly secure the same thereon.

A hollow shaft 15 is journaled in a boss bearing projecting inward from the head 5 and on a bearing stud 17 projecting inwardly from the head 3. The shaft is confined axially by the engagement of a shoulder $15^a$ thereon with the end of said boss bearing and the engagement of the end of the shaft with the head 3. The head 5 is formed to present an outward projecting flange 19 and a recess 21. In this recess is introduced packing 21 adapted to be pressed toward the inner end of the recess by a helical spring 23 encircling the shaft 15 and confined between said packing and a boss 25 fast on said shaft. Preferably this boss is formed to present a lip 27 projecting over to serve as a further bearing for the shaft and present a housing for the head flange 19. By this construction there is provided a very efficient stuffing box which will prevent any possibility of leakage from within the cylinder outward along the shaft.

Within the cylinder is a piston 29 mounted on and adapted to slide along the shaft 15. To rotate said piston with said shaft a portion of the latter is slabbed off to present flat faces 31.

The container is adapted to receive glycerin or other appropriate liquid or fluid for resisting the sliding of the piston along said shaft. The glycerin may be introduced into said cylinder through openings on opposite sides of said piston normally closed by plugs 33 threaded therein.

To cause the piston to be reciprocated in the cylinder and move axially of the shaft on rotation of the latter, cam means is provided typified herein as a pair of cams 35, 35 (Fig. 13) projecting inward from the cylinder head 3 and adapted to coöperate with a pair of cams 37, 37 projecting from one side of the piston 29. The cylinder head 5 is also provided with a pair of cams 39, 39 for coöperation with cams 41, 41 projecting from the opposite side of the piston. When the shaft is rotated the piston cams will wipe over the cylinder head cams and thereby positively move the piston axially of the shaft.

It is highly desirable to provide a shock absorber which may be adjustable for varying conditions. For example, the springs of a vehicle having a heavy body require more opposition from a shock absorber than the springs of a vehicle having a light body. An important feature of the invention relates to means whereby the resistance to the reciprocating movement of the piston may be varied according to conditions as required. To accomplish this a plug or member 43 is introduced within the hollow shaft 15 and is provided with passage means providing communication between ports 45 and 47 in said shaft. This passage means is typified herein by a peripheral duct 49 extending longitudinally of said plug toward one end thereof and preferably provided with an entrance mouth 49$^a$ projecting laterally therefrom.

When the plug 43 is turned to the position shown in Fig. 8 its mouth 49$^a$ registers fully with the port 45. Consequently when the port 45 is uncovered by the piston, glycerin may pass from one side of the latter through the shaft port 45, entrance mouth 49$^a$, duct 49 and shaft port 47 to the opposite side of the piston.

If the member 43 is turned to the position shown in Fig. 9 the entrance mouth 49$^a$ is throttled somewhat and provides a more restricted passage from one side of the piston to the other.

If the member 43 is turned to the position shown in Fig. 10 the entrance 49$^a$ will be cut off from communication with the shaft port 45 and no glycerin can pass through the duct 49.

To provide a further variation in the passage of the glycerin from one side of the piston to the other the member 43 may contain a bore or recess 51 having an open end formed to present a seat 53 adapted to receive a ball valve 55 urged toward said seat by a helical spring 57 confined between said ball and a recess in the bearing stud 17 referred to. The member has a port 59 therein adapted for communication with the ports 45 of the shaft. When the member 43 is turned to the position shown in Fig. 10 the port 59 registers with the shaft port 45 and glycerin may pass from one side of the piston to the other through the port 45, port 59, recess 51, past the ball valve 53 and through the shaft port 47. If, however, the piston is moved in the opposite direction tending to force glycerin into the shaft port 47 it will tend to seat the ball valve more firmly and prevent flow of glycerin to the opposite side of the piston. This is an advantageous feature since in some cases it is desirable to provide a greater check for the movement of the piston in one direction than for the movement thereof in the opposite direction. For example, it is frequently desirable to provide a greater check for the recoil or upward movement of the body of the vehicle than for the downward movement thereof.

As shown herein the duct 49 and port 59 are provided in duplicate at diametrically opposite points in the member although one set might be used if desired.

To effect the described rotative adjustments of the member 43 it has a stem 61 projecting outward therefrom through the shaft and beyond the end thereof. This stem is somewhat smaller than said member and presents a shoulder 62 for engagement with a gasket in a shoulder of the shaft to limit movement of said stem outward axially. To secure said member in its different positions of rotative adjustment its outward end is threaded to receive a nut 63 adapted to bear against the outer end of the shaft 15. When this nut is tightened it will draw the stem 61 outward and through the shoulder 62 will secure the member in position.

The passage means for varying the freedom of flow of the glycerin from one side of the piston to the other is concealed within the casing where it is impossible to see the proper adjustments thereof. To enable the adjustment of the member 43 to vary the flow as desired the stem 61 has on the end thereof an index line 64 herein identical with the screw driver receiving kerf and cooperating with a dial ring 65 fast on the outer end of the hub 25 referred to. This dial is marked with diametrically opposite sets of graduations each numbered 0, 1, 2 and 3 as shown in Fig. 1. When the index line registers with the graduations marked 0 the valve member 43 is in the position shown in Fig. 8. When the index registers with the graduations marked 1 the valve member is in the position shown in Fig. 9. When the index registers with the graduations marked 2 the valve member is in the position shown in Fig. 10. And when the index registers with the graduations marked 3 the valve member is in the position shown in Fig. 11.

Thus to adjust the valve member it is merely necessary to release the nut 63, apply a screw driver to the end of the stem 61 and turn the same until the index line thereof registers with the graduations on the dial desired. Then the nut 63 is tightened again and holds the member fixed in the position to which it is set. The shock absorber by this adjustment has great flexibility since it is readily adaptable to different vehicles and conditions by a simple, obvious and easily effected adjustment.

The rotation to the shaft 15 for causing the piston to slide along the same may be effected in various ways as desired. As shown herein this is accomplished by providing the cylinder 1 with an arm 67 (Fig. 1) conveniently integral with said cylinder and an arm 69 fast on and conveniently integral with the hub 25 referred to as secured to the shaft 15. The arm 67 may be pivotally connected to the axle of the vehicle and the arm 69 may be pivotally connected to the body of the vehicle.

An important feature of the invention relates to the construction of these pivotal connections whereby non-rattling connections are obtained. The pivotal connections for the arms are similar and a description of one will suffice for both. Referring to Fig. 3 the arm is provided with an eye formed to present conical seats 71 and 73. Through this eye passes a pin 75, one end of which may be secured to the vehicle in any appropriate manner. Fast on this pin is a conical flange 77 adapted to bear against the conical seat 71. Loose on said pin is a conical ring 79 adapted to bear against the conical seat 73. To press said flange and ring toward said seat a nut 81 is threaded on said pin and adapted to bear against a spring washer 83 interposed between said nut and ring 79. The nut 81 may be locked against rotation by a pin 85.

Preferably the eye in the arm is somewhat larger than the pin 75 and the flange 77 and ring 79 are formed to terminate so as to provide an oil containing chamber 87 in which oil may be pocketed and furnish an appropriate lubrication for the surfaces between the conical seats and the flange and ring.

By this construction there is provided a simple and effective pivotal connection of the arm with the vehicle which will always be maintained sufficiently tight to prevent rattling or disconnection of the parts and at the same time provide a sufficient freedom of pivotal movement for the arm.

Having described one illustrative embodiment of the invention without limiting the same thereto, what we claim as new and desire to secure by Letters Patent is:

1. A shock absorber comprising in combination, a cylinder, a hollow shaft having a port therein, a piston rotative with said shaft, means for sliding said piston along said shaft on rotation of the latter, a valve member in said shaft having a recess in one end thereof, a port providing communication from said shaft port to said recess, and valve means for the end of said recess.

2. A shock absorber comprising in combination, a cylinder, a hollow shaft having a port therein, a piston rotative with said shaft, means for sliding said piston along said shaft on rotation of the latter, a valve member in said shaft having a recess in one end thereof, a port providing communication from said shaft port to said recess, and a spring pressed ball adapted to seat on the end of said recess.

3. A shock absorber comprising in combination, a cylinder, a hollow shaft having port means, a piston rotative with said shaft, means for sliding said piston along said shaft, and a valve member in said shaft having a port and a peripheral duct for alternative communication with the port means of said shaft.

4. A shock absorber comprising in combination, a cylinder, a hollow shaft having port means, a piston rotative with said shaft, means for sliding said piston along said shaft, and a member having peripheral and internal ducts for alternative communication with the port means of said shaft.

5. A shock absorber comprising in combination, a cylinder, a shaft having ports therein, a piston rotative with said shaft, means for sliding said piston along said shaft on rotation of the latter to open and close said ports, a member in said shaft having a passage providing communication between said ports, and valve means for said passage.

6. A shock absorber comprising in combination, a cylinder, a hollow shaft journaled therein having a plurality of ports, a piston rotative with said shaft, means for sliding said piston along said shaft on rotation of the latter, a member in said shaft having duct means therein for providing communication between the ports in said shaft, and means for adjusting said member to different fixed positions in said shaft for varying the effectiveness of the passage therethrough.

7. A shock absorber comprising in combination, a cylinder having a counter-bore therein presenting a shoulder, a head seated on said shoulder, a ring threaded into said cylinder for pressing said head against said shoulder, a hollow shaft journaled in said head, a piston rotative with said shaft, and cam means for said piston and the heads of the cylinder for sliding said piston axially of said shaft on rotation of the latter.

8. A shock absorber comprising in combination, a cylinder having a head formed to present a recess and a flange projecting outward therefrom, a hollow shaft journaled in said head, packing in said recess, a boss fast on said shaft, a helical spring in said recess confined between said packing and said boss, a piston in said cylinder rotative with said shaft, cam means for sliding said piston along said shaft, and means for conducting fluid through said hollow shaft from one side of the piston to the other.

9. The combination with a casing of a reciprocable element therein, a hollow shaft for said element having ports therein, a member coöperating with said shaft having valve means to by-pass fluid from one side of said element through said ports to the opposite side of said element, and valve means to permit fluid to pass through said ports in one direction, but not in the opposite direction; said valve member being adjustable to render said first and second named valve means alternatively operable.

10. The combination with a casing 1 of a reciprocable element 29 therein, a hollow shaft 15 coöperating with said element having ports 45, 47 therein for communication with opposite sides of said element, a member 43 coöperating with said shaft having a by-pass 49 and a passage 59, means to adjust said member to bring said by-pass and passage alternatively into communication with said ports, and a valve 55 coöperating with said passage to permit fluid to flow in but one direction through said ports when said passage communicates with said ports.

11. The combination with a casing of a hollow shaft journaled therein provided with ports, a piston on said shaft, means to cause said piston to slide axially of said shaft, a member coöperating with said shaft having a by-pass and a passage, means to adjust said member to bring said by-pass and passage alternatively into communication with said ports, and a valve coöperating with said passage to permit fluid to flow in but one direction through said ports when said passage communicates with said ports.

12. The combination with a casing of a hollow shaft having port means, a piston rotative with said shaft, means to slide said piston along said shaft, a valve member in said shaft having a by-pass and a passage for alternative communication with said port means, and a spring-pressed ball valve coöperating with said passage to control the flow of fluid through said port means.

13. The combination with a casing of a hollow shaft journaled therein having port means, a piston on said shaft, means to slide said piston along said shaft, a valve member coöperating with said shaft having a by-pass and a passage therein, means to adjust said member to bring said by-pass and passage into alternative communication with said port means, and index means for indicating the adjustments of said member.

In testimony whereof, we have signed our names to this specification, in the presence of two subscribing witnesses.

CARL EIBYE.
CHRISTIAN A. PETERSEN.

Witnesses:
HENRY T. WILLIAMS,
ROBERT H. KAMMLER.